United States Patent Office 3,212,629
Patented Oct. 19, 1965

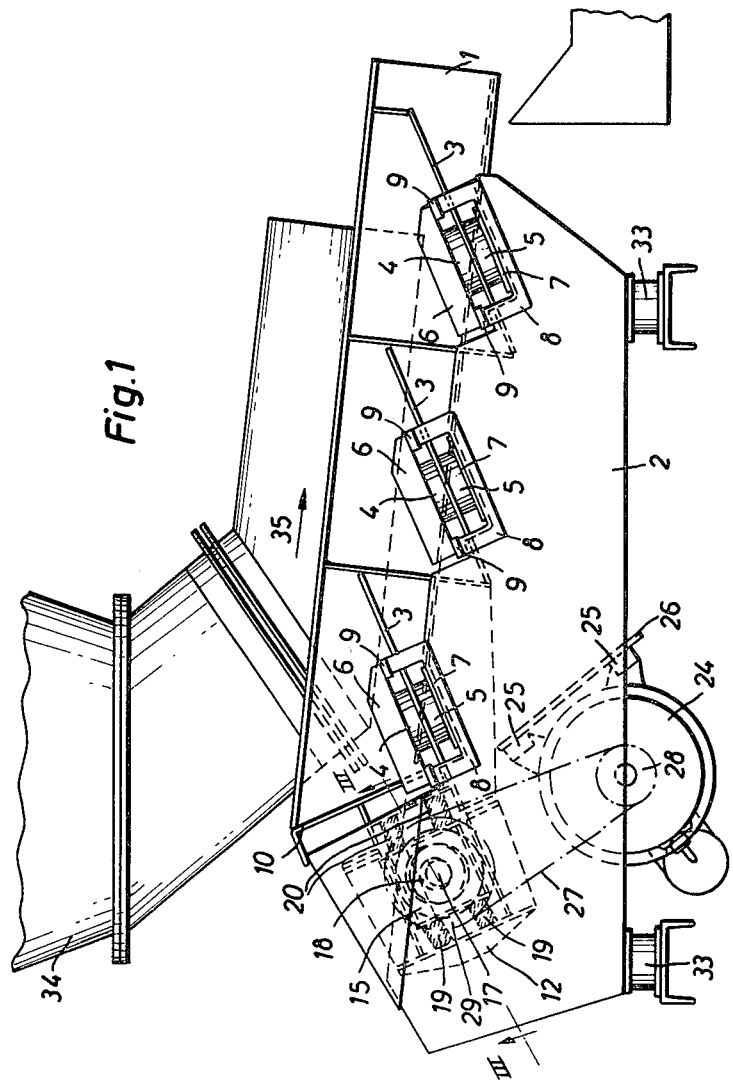

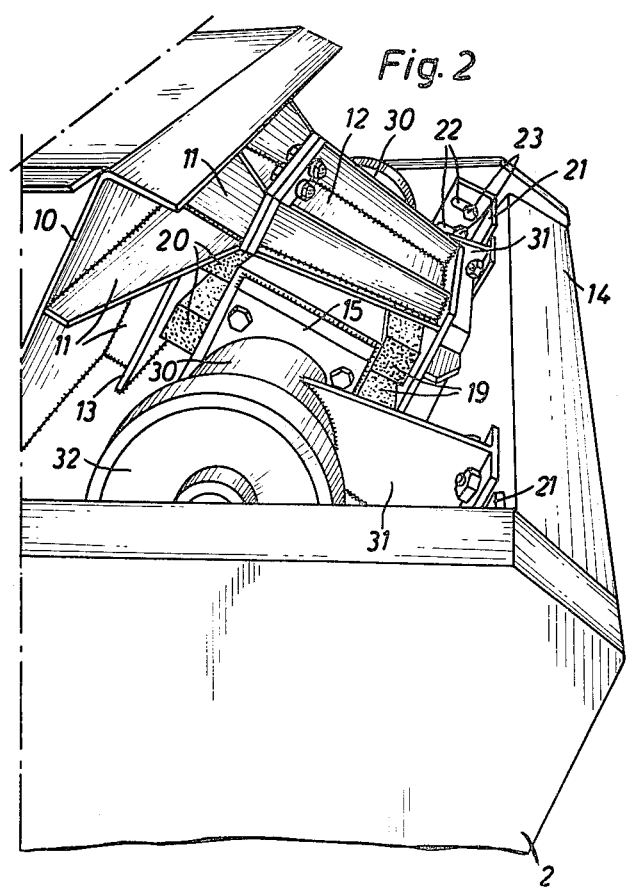
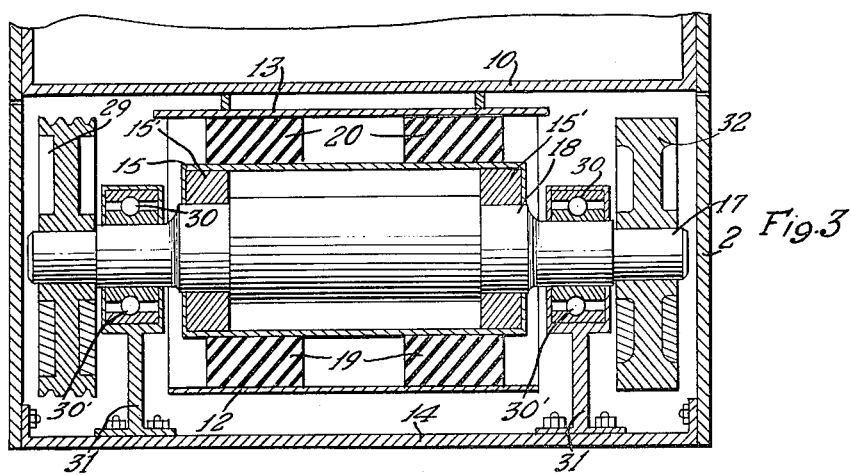

3,212,629
VIBRATORY CONVEYOR, PARTICULARLY
BIN-DISCHARGE CONVEYOR
Heinz Jochem Maeder, Cologne-Dellbruck, and Peter Wehren, Cologne-Mulheim, Germany, assignors to Klockner-Humboldt-Deutz Aktiengesellschaft, Cologne-Deutz, Germany, a corporation of Germany
Filed Apr. 23, 1963, Ser. No. 274,962
7 Claims. (Cl. 198—220)

Our invention relates to vibratory conveyors, particularly to pan-type or trough-type feeders or conveyors for discharging bunkers and other storage bins, in which the conveying oscillations are produced by a rotating eccentric drive member, such as a crank pin or eccentric cam, connected to the working mass structure of the conveyor through the medium of a loose elastic coupling.

It is an object of our invention to devise a vibratory conveyor that is particularly well suitable as a bin-discharge trough or for similar requirements and combines a simple space-saving construction with trouble-free operation and a minimum of operating noise.

To this end, and in accordance with our invention, we journal a drive or pitman head on the crank or eccentric member of the vibration producing conveyor drive and connect the head with the working mass, constituted by the vibratory pan or trough structure of the conveyor, by pre-stressed elastic bodies through which the force from the drive to the conveyor structure is transmitted, the connection being such that the elastic bodies are kept under pre-stressing force during the entire cyclical motion of the eccentric drive member.

According to another feature of our invention, the elastic bodies, preferably rubber bodies, are mounted in symmetrical relation to the rotational axis of the eccentric drive member on opposite sides respectively of the journalled head. As a result, the elastic connection is such that the forces required for imparting oscillating motion to the conveyor structure are transmitted from the pitman head to the conveyor structure in only one given direction without interposed further force-transmitting structure.

According to another feature of our invention, we provide U-shaped clamping stirrups for placing the pitman head and the elastic bodies under pre-stressing force, the clamping stirrup extending around the head and the elastic bodies and being fastened to the conveyor structure that constitutes the working mass of the vibratory system.

As a rule, the drive motor with the shaft for the crank or eccentric cam is mounted on a counter mass which is joined with the conveyor structure or working mass of the system by springs. According to another feature of our invention, the front wall of the machine frame or of the counter mass is designed as a transverse beam structure and is displaceable in the direction of the vibratory motion, and the drive shaft carrying the eccentric drive member with the pitman head, is journalled in bearings secured to the displaceable wall structure. By displacing the wall structure the pitman head, connected with this wall through the drive shaft and bearings, can be adjusted and pre-stressed between the elastic bodies mounted on both sides of the head relative to the direction of oscillatory motion.

According to still another feature of our invention, the drive of the eccentric member is mounted near the front of the conveyor beneath the material feeder location and within the confines of the machine frame or counter mass. Such an arrangement of the driving means inside the counter mass structure affords good protection of attending personnel from being injured by moving machine parts.

An embodiment of the invention is illustrated by way of example on the accompanying drawings in which:

FIG. 1 is a lateral elevation of a vibratory conveyor constructed in accordance with our invention and designed as a bin-discharge trough;

FIG. 2 is a schematic perspective view of part of the same conveyor at the material entering location; and FIG. 3 is a fragmentary sectional view of FIG. 1 taken along the line III—III in the direction of the arrows.

As apparent from FIG. 1, the vibratory conveyor comprises two oscillating masses, namely a conveyor trough 1 which constitutes the working mass proper, and a counter mass 2 designed as a machine frame structure. Fastened to the lateral walls of the conveyor trough 1 in a direction inclined to the conveying direction, are flat irons 3 whose protruding ends are held between respective pairs of rubber springs 4, 5. The two circular bodies that constitute the respective springs 4 and 5 of each pair are firmly clamped and stressed between a bracket 6 and an abutment plate 7, both mounted on a console 8 by means of screw bolts (not illustrated). The amount of pre-stressing force can be varied by insertion of shim sheets 9 between the brackets 6 and the consoles 8. The pre-stress thus imposed upon the rubber springs 4, 5 is so chosen that the contact areas between the rubber springs 5, 4 and the adjacent metal surfaces of structures 3, 6, 7 are always kept subjected to a holding friction of such magnitude that the rubber springs, preferably inserted loosely when the machine is being assembled, will securely adhere to the respective counter faces.

At the material entrance side the conveyor trough is provided with an upwardly and outwardly inclined front wall 10 reinforced by welded bracing ribs 11 (FIG. 2). Fastened to the ribs 11 by screw bolts is a U-shaped clamping stirrup 12. A plate 13 at about the middle of the front wall 10 serves as an abutment surface for force-transmitting elastic bodies 20 more fully described below.

As also shown in FIGS. 2 and 3, the front wall 14 of the machine frame structure 2 that constitutes the counter mass is designed as a transverse beam structure and carries bearings 30 on respective standards 31 on axially opposite sides of the drive or pitman head 15. A drive shaft 17 (FIGS. 1 and 3) is journalled in the two bearings 30 and is firmly joined with an eccentric cam 18 on which the pitman head 15 is journalled. The head has a rectangular cross section. The front wall 14 (FIGS. 2 and 3) is displaceable relative to the lateral walls of the counter-mass structure 2 in the direction of oscillation and can be fixed in any desired position or displacement. As a result, the pitman head 15 on the eccentric can be set very accurately to the middle between the elastic bodies 19 and 20 mounted on both sides respectively of the pitman relative to the direction of oscillation. The amplitudes of oscillation produced by the drive can be made highly uniform in this manner.

To permit the just-mentioned adjustment of the front wall relative to the machine frame, the front wall 14 carries angle irons 21 (FIG. 2) which have slots 22 in their flanges adjacent to the lateral walls of the machine frame. The slots 22, extending in the direction of oscillation, are traversed by respective screw bolts 23 rigidly joining the angle irons with the lateral walls of the frame structure 2. The pitman head can be displaced to any desired position between the elastic bodies after loosening the bolts 23 in the slots 22, and can then be fixed in the desired position by again tightening the bolts. The flange of each angle iron 21 adjacent to the front wall 14 is rigidly and permanently joined therewith.

Mounted on the bottom side of the counter-mass structure 2 is the drive for producing the oscillating conveyor motion. The drive comprises an electric motor 24, the drive shaft 17 with the eccentric cam 18, and the pitman head 15. The motor 24 is secured to the structure 2 by means of consoles 25 on a plate 26 beneath the oscillation-producing components. A V-belt 27 connects the motor by means of belt sheaves 28, 29 with the drive shaft. The drive shaft is journalled in the housings of bearings 30 (FIGS. 2 and 3) by roller bearings 30'. The standards 31 of bearings 30 are rigidly joined with the front-wall 14 of the counter-mass structure 2. A balancing disc 32 (FIGS. 2 and 3) is mounted on the drive shaft 17 at the side opposite the belt sheave 29 (FIGS. 1 and 3).

The externally square pitman head 15 is journalled on the eccentric 18 by means of roller bearings 15'. The eccentric 18 and the pitman head 15 are located in the middle of the two bearings 30. The pitman head is straddled by the clamping stirrup 12 connected with the conveyor trough 1. As a result, the pitman head is stressed with respect to the conveyor trough 1 through the medium of the interposed elastic rubber bodies 19 and 20. This has the advantage that the driving forces required for excitation of the oscillating conveyor motion are directly transmitted to the conveyor trough 1 from the drive shaft 17 through the eccentric 18 and the pitman head 15 only through the interposed elastic bodies 19 and 20, without the interposition of further force-transmitting structures, such as pusher rods or the like. This results in a particularly simple and compact construction of the vibratory machine for a relatively high conveying capacity and small space requirements. Furthermore, the vibratory conveyor is distinguished by a particularly quiet run, and also by uniform oscillations which manifest themselves by a very uniform discharge of material through the conveyor trough.

Since the oscillating motion of the conveyor trough is caused by the eccentric rotation of the pitman head between the elastic bodies 19, 20 stressed relative to the conveyor trough 1, the shape and arrangement of these bodies should be properly chosen. We have found it preferable to design the elastic bodies as elongated rubber springs 19, 20 of narrow shape which are clamped and stressed between the clamping stirrup 12 (FIGS. 2 and 3) and the pitman head 15 (rubber body 19) on the one hand, and between the front wall 10 of the conveyor trough 1 and the pitman head 15 (rubber body 20) on the other hand. The amount of stress thus permanently imposed upon the rubber bodies is such that a mutual gliding or lateral shifting of the rubber bodies is impossible. As far as their spring hardness is concerned, the rubber bodies are hard in the oscillataing direction but very soft in the direction perpendicular to the oscillation. This design of the rubber springs has the advantage of permitting a damped swaying of the drive perpendicularly to the direction of oscillation so that, in the event the conveyor trough becomes blocked, the vibratory machinery is not damaged. If desired, the operating conditions or the conveying through-put of the conveyor can be modified, for example by changing the spring constant. A variation of the spring constant in such a case can be obtained in a simple manner by leaving hollow spaces inside the rubber springs which are filled with air of respectively different pressure.

The counter mass 2 of the vibratory conveyor is supported relative to ground in known manner by rubber buffers 33 (FIG. 2) of a relatively small spring constant. In the embodiment illustrated in FIG. 1, the material to be conveyed is charged onto the left-hand end of the conveyor trough from a bin or bunker 34 in the direction indicated by an arrow 35. Due to the directional thrust of the pulsating conveyor motion, the material travels from the left to the right and leaves the trough at the right-hand end.

The mass ratio of the conveyor trough to the counter mass is preferably so chosen that the amplitude of the conveyor trough is relatively large and that of the counter mass very small. Due to the small amplitude of the counter mass, in conjunction with the slight spring constant of the rubber buffers 33, only very slight and virtually negligible oscillatory forces are transmitted to the foundation.

To those skilled in the art it will be obvious, upon a study of this disclosure, that machines according to our invention can be modified in various respects and can be given embodiments other than particularly illustrated and described herin, without departing from the essential features of our invention and within the scope of the claims annexed hereto.

We claim:

1. A vibratory conveyor comprising a vibratorily mounted conveying structure, a counter-mass structure resiliently supported relative to ground and elastically connected with said conveying structure, and a drive mounted on said counter-mass structure for imparting conveying oscillations in only one given direction to said conveying structure, said drive having a rotating member eccentric to the axis of rotation and supported by bearings fixed to said counter-mass structure, a drive head journalled on said member, pre-stressed elastic bodies connecting said head with said conveying structure for transmitting force from said drive to said conveying structure, and stressing means engaging said bodies and maintaining them and said head under pre-stressing force in said given direction during the entire cycle of ececntric motion of said member.

2. A vibratory conveyor comprising a vibratorily mounted conveying structure, a counter-mass structure resiliently supported relative to ground and elastically connected with said conveying structure, a drive mounted on said counter-mass structure and having an eccentrically rotating member supported by bearings fixed to said counter-mass structure, a drive head journalled on said member, rubber spring bodies elastically connecting said head with said conveying structure for transmitting force from said drive to said conveying structure for imparting oscillations thereto in only one given direction, and stressing means engaging said bodies and maintaining them and said head under pre-stressing force in said given direction during the entire cycle of ececntric motion of said member.

3. A vibratory conveyor comprising a vibratorily mounted conveying structure, a counter-mass structure resiliently supported relative to ground and elastically connected with said conveying structure, and a drive mounted on said counter-mass structure for imparting conveying oscillations in only one given direction to said conveying structure, said drive having a rotating member eccentric to the axis of rotation and supported by bearings fixed to said counter-mass structure, a drive head journalled on said member, prestressed elastic bodies connecting said head with said conveying structure for transmitting force from said drive to said conveying structure, said bodies being mounted on diametrically opposite sides of said axis in symmertical relation thereto and in a diametrical direction substantially parallel to said given direction of the conveyor oscillations, said bodies and said head being under stress in said given direction, whereby the entire force transmitted from said member to said conveying structure in said given direction is transmitted through said bodies.

4. A vibratory conveyor comprising a vibratorily mounted conveying structure, a counter-mass structure resiliently supported relative to ground and elastically connected with said conveying structure, and a drive mounted on said counter mass structure for imparting conveying oscillations in only one given direction to said conveying structure, said drive having a rotating member eccentric to the axis of rotation and supported by bearings fixed to said counter-mass structure, a drive head journalled on said member, pre-stressed elastic bodies connecting said head with said conveying structure for transmitting force from said drive to said conveying structure, and a U-shaped clamping stirrup rigidly fastened to said conveying structure and straddling said bodies and said head under compressing stress acting in said given direction, whereby said bodies are maintained under pre-stressing force during the entire cycle of eccentric motion of said member.

5. A vibratory conveyor comprising a vibratorily mounted conveying structure, a counter-mass structure resiliently supported relative to ground and elastically connected with said conveying structure, one of said structures having a wall extending transverse to the conveying direction and adjustable in the direction of oscillation, bearings fixed to said wall, a drive for imparting conveying oscillations in only one given direction to said conveying structure, said drive having a drive shaft journalled in said bearings and having an eccentric member on said shaft, a drive head journalled on said eccentric member, pre-stressed elastic bodies connecting said head with said other structure, said bodies being mounted on diametrically opposite sides of said shaft, and stressing means engaging said bodies under pre-stressing force in the direction of oscillation during the entire cycle of eccentric motion of said member.

6. A vibratory conveyor comprising a vibratorily mounted conveying structure, a counter-mass structure resiliently supported relative to ground and elastically connected with said conveying structure, said counter-mass structure having a wall extending transverse to the conveying direction and adjustable in the direction of oscillation, bearings fixedly mounted on said wall, a drive for imparting conveying oscillations in only one given direction to said conveying structure, said drive having a drive shaft journalled in said bearings and having an eccentric member on said shaft, a drive head journalled on said eccentric member, elastic bodies connecting said head with said other structure, said bodies being mounted on diametrically opposite sides of said shaft, a clamping stirrup fastened to said conveying structure and straddling said bodies and said head under compressing stress, whereby said bodies are maintained under pre-stressing force during the entire cycle of eccentric motion of said member.

7. In a vibratory conveyor according to claim 6, said drive inclusive of said shaft and said eccentric member with said drive head and said elastic bodies being mounted substantially within the confines of said counter-mass structure at one end of the conveyor beneath the material receiving location of said conveying structure.

References Cited by the Examiner
UNITED STATES PATENTS

| | | | |
|---|---|---|---|
| 2,702,634 | 2/55 | Roubal | 209—367 |
| 2,707,559 | 5/55 | Saxe | 209—367 X |
| 2,747,418 | 5/56 | Eckley | 209—366.5 X |
| 2,779,470 | 1/57 | Walters. | |
| 2,806,583 | 9/57 | Morris. | |
| 2,947,183 | 8/60 | Carrier et al. | |
| 2,984,339 | 5/61 | Musschoot | 209—365 |
| 3,035,699 | 5/62 | Bruderlein et al. | 209—339 |
| 3,039,609 | 6/62 | Lippmann | 209—366.5 X |
| 3,056,488 | 10/62 | Musschoot | 209—365 X |
| 3,061,079 | 10/62 | Morris. | |
| 3,089,582 | 5/63 | Musschoot. | |
| 3,112,823 | 12/63 | Musschoot et al. | 209—367 X |

SAMUEL F. COLEMAN, *Primary Examiner.*

WILLIAM B. LA BORDE, *Examiner.*